US007991159B2

(12) United States Patent
Floyd

(10) Patent No.: US 7,991,159 B2
(45) Date of Patent: Aug. 2, 2011

(54) LAYERED MOBILE APPLICATION SECURITY SYSTEM

(75) Inventor: David G. Floyd, Sparta, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1499 days.

(21) Appl. No.: 11/299,027

(22) Filed: Dec. 9, 2005

(65) Prior Publication Data

US 2007/0135111 A1 Jun. 14, 2007

(51) Int. Cl.
*H04M 3/00* (2006.01)

(52) U.S. Cl. ............. 380/270; 713/161; 713/165; 726/3

(58) Field of Classification Search .................. 713/161, 713/165, 194; 709/223, 224, 227, 232; 726/2, 726/3; 455/418; 380/270
See application file for complete search history.

(56) References Cited

U.S. PATENT DOCUMENTS

| | | | | |
|---|---|---|---|---|
| 4,558,176 A * | 12/1985 | Arnold et al. | ................. | 713/190 |
| 6,700,902 B1 * | 3/2004 | Meyer | ........................... | 370/468 |
| 6,938,163 B1 * | 8/2005 | Birkler et al. | ................. | 713/193 |
| 7,340,734 B1 * | 3/2008 | de Waal | ........................ | 717/159 |
| 2001/0051515 A1 * | 12/2001 | Rygaard | ........................ | 455/410 |
| 2002/0095601 A1 * | 7/2002 | Hind et al. | ..................... | 713/201 |
| 2003/0060229 A1 * | 3/2003 | Lai et al. | ........................ | 455/556 |
| 2004/0193987 A1 * | 9/2004 | Sigbjornsen et al. | ......... | 714/741 |
| 2005/0246575 A1 * | 11/2005 | Chen et al. | ........................ | 714/6 |
| 2006/0047973 A1 * | 3/2006 | Kim | .............................. | 713/190 |
| 2006/0101454 A1 * | 5/2006 | Whitehead | .................... | 717/168 |
| 2006/0240804 A1 * | 10/2006 | Backholm et al. | ......... | 455/412.1 |

* cited by examiner

*Primary Examiner* — Benjamin E Lanier
*Assistant Examiner* — Hadi Armouche
(74) *Attorney, Agent, or Firm* — Carlson, Gaskey & Olds PC

(57) ABSTRACT

A wireless communication network (20) including mobile applications (56-62) includes a security approach that uses a combination of at least two techniques (42, 50, 54, 72). One disclosed example includes a combination of all four techniques. The combined, layered approach greatly reduces the probability that an unauthorized individual will be able to masquerade as a valid application within the network so that network security is improved. Disclosed techniques include obfuscating software code of a mobile application, providing a mobile application with a plurality of code signatures for generating a corresponding plurality of unique control values, limiting the useful lifetime of a mobile application and determining that a control value of a mobile application corresponds to the control value of another application before the two applications are allowed to interact in a manner that could compromise either application or the network.

18 Claims, 2 Drawing Sheets

LAYERED MOBILE APPLICATION SECURITY SYSTEM

FIELD OF THE INVENTION

This invention generally relates to communications. More particularly, this invention relates to wireless communications.

DESCRIPTION OF THE RELATED ART

Wireless communication systems are well known. Many systems are fixed systems in that they include hardware devices that are situated in a fixed position to facilitate communications on behalf of mobile stations such as cell phones. For example, base stations and radio network controllers are fixed hardware devices that remain stationary for the most part during the useful service life of the device.

Other wireless communication networks do not have fixed or stationary devices. In such networks, the hosts, agents or both are mobile. These networks are sometimes referred to as ad-hoc wireless networks or mobile application networks. These types of networks have use, for example, in military applications where a plurality of mobile vehicles include or carry communication devices for communicating with others who are within another mobile vehicle.

In wireless networks that include mobile applications, there are additional security concerns compared to wireless networks with fixed devices such as base stations. This is due, in part, because such wireless ad-hoc networks often include mobile applications that are employed for various reasons. Mobile applications, as that term is used in this description, refers to applications that support moving nodes or hosts and migrating code that can be communicated between nodes or hosts. The completely mobile nature of such networks renders them more vulnerable to compromise by a maliciously designed application or host. The entirely mobile nature of the network leaves it with no clear line of defense.

For example, a plurality of nodes may be active within a wireless network. An unauthorized individual may capture sufficient information regarding a mobile application to reverse engineer it to understand how it works. Such an individual may then create an unauthorized agent that appears acceptable to other participants in the network. That unauthorized agent may be arranged to perform some malicious activity that would interfere with the proper communications within the network, for example.

Approaches have been suggested to avoid such attack upon a mobile network but none provide a sufficient level of security. This invention addresses the need for more security in such a network.

SUMMARY OF THE INVENTION

An exemplary method of communicating includes protecting the integrity of a wireless network using a combination of at least two techniques including obfuscating software code of a mobile application, providing a mobile application with a plurality of code signatures, limiting a useful lifetime of the mobile application and determining that a control value of a first mobile application corresponds to a control value of a second mobile application before allowing interaction between the first and second mobile applications.

One example includes using at least three of such techniques. Another example includes using a combination of all four of the techniques just mentioned.

One example includes obfuscating software code of a mobile application by scrambling identifiers of the mobile application. Another example includes changing how data associated with the mobile application is stored in memory. Another example includes placing so-called "dead code" within a mobile application that is not used for running the mobile application.

In one example, using a plurality of code signatures allows for periodically and randomly using one of the plurality of code signatures. In one example, generating code signatures includes maintaining dependencies between code statements necessary for the mobile application to perform its intended function while rearranging at least two code statements to thereby provide a different signature compared to another arrangement of the statements.

In one example, the useful lifetime of a mobile application has a selected duration that is less than a time during which the function of that mobile application is desired within the wireless network. After the selected duration has expired, a corresponding replacement mobile application is used within one example.

One example includes having a plurality of mobile applications expire at about the same time and replacing them with a new generation of corresponding applications.

One example includes using a hash function to determine the control value used for controlling interaction between mobile applications. In one example, whenever the control value does not correspond to an expected value, a voting approach is employed to determine which of the mobile applications is incorrect. In one example, other mobile agents within the network independently determine the control values of each of the applications that do not have corresponding control values. Based upon that determination, at least one of the applications is determined to be invalid and the network does not recognize that application for further communications.

The various features and advantages of this invention will become apparent to those skilled in the art from the following detailed description. The drawings that accompany the detailed description can be briefly described as follows.

DETAILED DESCRIPTION

This invention provides a layered approach to providing security for ad-hoc wireless network that include mobile agents and mobile applications. Utilizing a combination of security techniques in a layered approach provides enhanced security that greatly reduces the likelihood of a successful attack on the integrity of such a wireless network.

Figure 1:
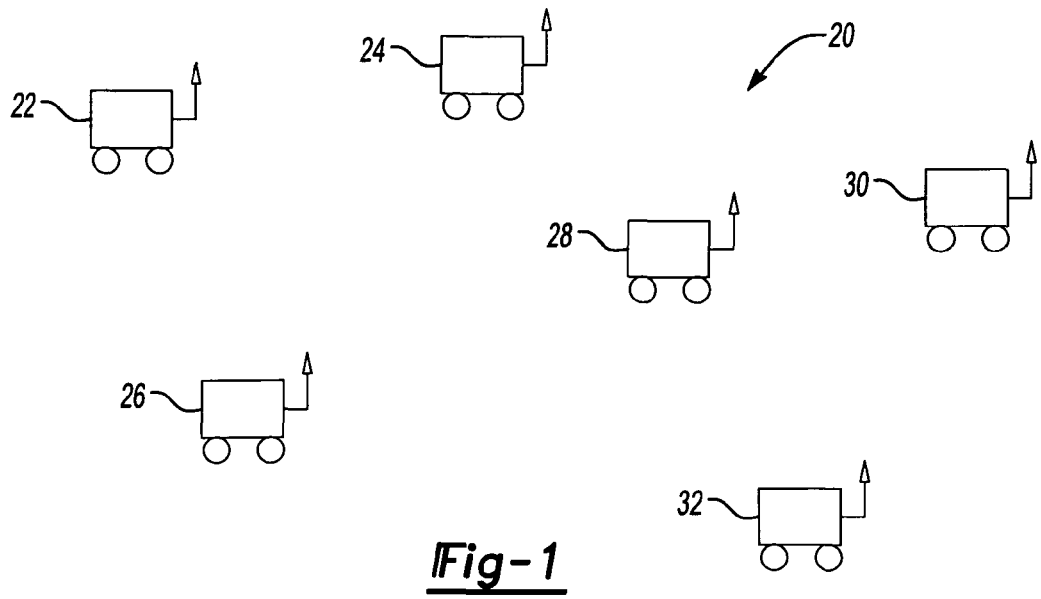
FIG. 1 schematically shows selected portions of an ad-hoc wireless network that is useful with an embodiment of this invention.

FIG. 1 schematically illustrates an example ad-hoc wireless network 20. In the illustrated example, a plurality of mobile agents 22, 24, 26, 28, 30 and 32 comprise vehicles that include or carry communication equipment capable of wirelessly communicating with corresponding equipment in another one of the vehicles. In this example, mobile applications are used within the wireless network 20. One example mobile application comprises a moving node. Another example mobile application comprises migrating code, which can be communicated between the various mobile agents 22-32.

Figure 2:
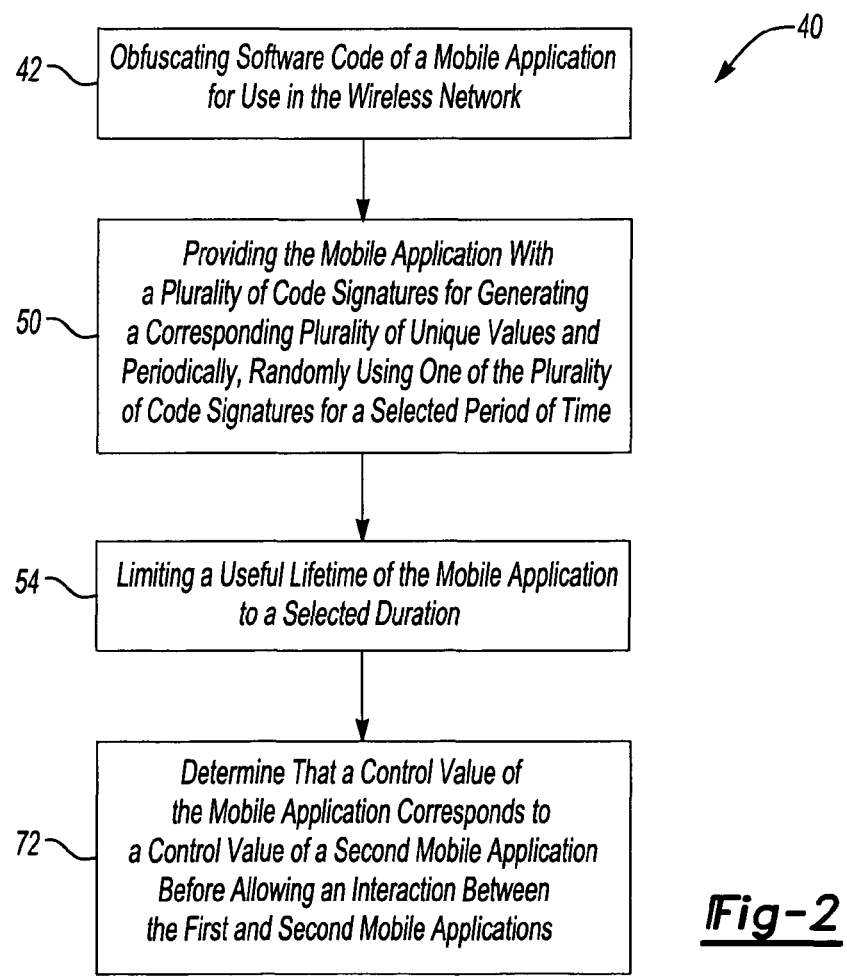
FIG. 2 is a flowchart diagram summarizing one example layered security approach according to an embodiment of this invention.

Protecting the integrity of the example wireless network 20 includes using a layered security approach that combines at least two techniques for increased security. FIG. 2 includes a flow chart diagram 40 summarizing one approach that includes four layers or four techniques that can be combined in different ways to achieve a desired result. In one example, at least two of the techniques outlined in FIG. 2 are combined for protecting the integrity of the wireless network. In another example, three of the four example techniques are used together. Still another example includes a combination of all four. The following description assumes that all four are combined, however, those skilled in the art who have the benefit of this description will realize how two or three of them could be used to meet the needs of their particular situation.

The approach shown in FIG. 2 includes obfuscating software code of a mobile application for use in the wireless network 20 at 42. There are several example techniques useful for obfuscating the software code in this manner. In one example, a layout technique is used, which includes scrambling identifiers of the code. Another technique includes changing how data is stored in memory. Another technique includes inserting "dead code" that will not be used for purposes of running the mobile application.

Figure 3:
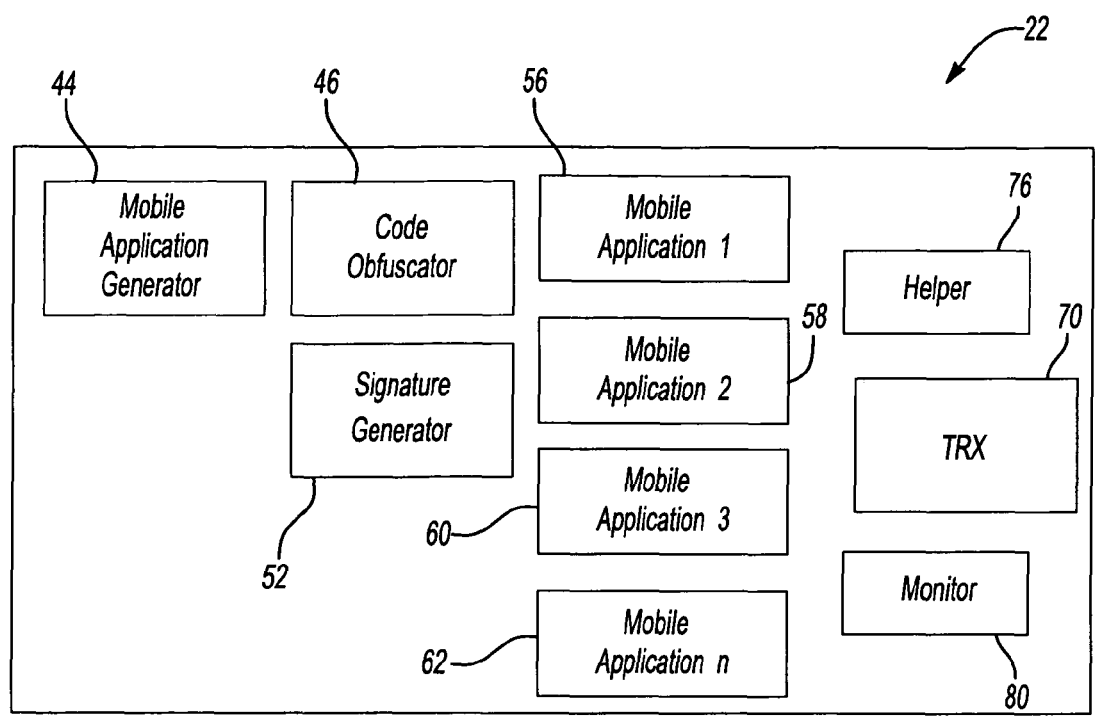
FIG. 3 schematically illustrates an example host that is capable of utilizing the example approach of FIG. 2.

FIG. 3 schematically shows one example host 22, which comprises appropriate portions of the mobile agent. In this example, a mobile application generator 44 generates software code useful as a mobile application for communication within the network 20. In one example, once the code is generated, the code generator 44 has no further contact with that code. A code obfuscator 46 is included in this example to apply a selected obfuscation technique to the software code before it is implemented within the network 20.

The example of FIG. 2 also includes a security technique at 50 for providing the mobile application with a plurality of code signatures. A corresponding plurality of unique values (e.g., a hash value) can be generated based upon the code signatures, respectively. The example of FIG. 2 includes periodically and randomly using one of the plurality of code signatures for a selected period of time. The example of FIG. 3 includes a signature generator 52 that manipulates the code of a mobile application after it has been obfuscated by the code obfuscator 46.

One example technique for generating multiple signatures includes shuffling the object code statements to create a copy of a mobile application that performs the same function as the original but has a different signature. A signature is based upon the specific sequence or order of bits in the binary form of the code. A different signature generates a different hash value using a known hashing technique. There is a high probability that if a sequence of code statements changes, a signature of the program will change and provide a different hash value.

In one example, a signature generator 52 determines or is provided with information regarding dependency between code statements that is necessary for the mobile application to perform its intended function. Any shuffling or rearranging of the code statements includes maintaining the dependencies necessary for program operation.

Using a combination of code obfuscation and multiple code signatures reduces the likelihood of a successful reverse engineering attack on the wireless network 20. For example, if an individual with malicious intent were to capture a mobile application, reverse engineering that would be rendered more difficult because of the code obfuscation performed on the mobile application within the network. Even if that were overcome, the use of multiple code signatures employed periodically in a random fashion would make it highly improbable that a successfully reverse engineered mobile application would be provided with a valid code signature. Utilizing multiple code signatures in a random fashion further decreases the likelihood of a successful attack.

Another protection technique in FIG. 2 is shown at 54 that includes limiting a useful lifetime of a mobile application to a selected duration. Having a mobile application useful for only a selected period of time decreases the window of opportunity within which a mobile application could be captured, reverse engineered and used as a basis for creating an invasive or malicious application to introduce that into the network. In one example, the mobile application generator 44 includes a time-to-live variable for each mobile application. Once the selected duration expires after that mobile application has been launched within the network 20, that mobile application expires and is rendered useless within the network. A replacement application to perform the same function is generated by the mobile application generator 44 with a new time-to-live variable, which may be the same or different compared to the previous version of that application. The replacement application in one example is obfuscated by the code obfuscator 46 and provided with at least one signature by the signature generator 52.

By using a combination of the techniques shown at 42, 50 and 54 in FIG. 2, further security can be obtained. For example, the time within which a falsified application may be developed and deployed, all mobile applications that would have communicated with it likely will have expired so that the unauthorized application will have no effect within the network because it will not be capable of communicating with any currently employed mobile applications.

In one example, an entire set of mobile applications have corresponding time-to-live variables. In the example of FIG. 3, there are a plurality of mobile applications 56, 58, 60 and 62 corresponding to n applications that are active at a particular time. In one example, the corresponding time-to-live variables control the expiration times of the various mobile applications so that they occur within a selected window of each other. Such an arrangement ensures that an entirely new generation of mobile applications is active within the network 20 on a selected, periodic basis.

In one example, more than one of the mobile applications will expire simultaneously. In some examples it will be beneficial not to have too many applications expiring simultaneously to reduce processing burdens associated with generating and implementing the replacement applications for the next generation of active applications. Those skilled in the art who have the benefit of this description will realize various strategies for coordinating expiration times when mobile applications have limited durations.

The example of FIG. 3 includes a transceiver 70 to facilitate various communications between the nodes within the wireless network 20. Some of the mobile applications will comprise migrating code that may be communicated between hosts by the transceiver 70 as needed or desired.

In one example, the limited duration of the time-to-live for each mobile application is selected to be significantly shorter than the time it would be expected for a captured mobile application to be successfully decompiled, reverse engineered and redesigned for malicious purposes. By the time such a malicious application could be deployed, the mobile applications of the same generation will all have expired so that control values such as hash values within the system are completely different at the time of the attempted deployment of the malicious application.

The example of FIG. 2 includes another technique for protecting the integrity of the mobile network 20. At 72, the example of FIG. 2 includes determining that a control value of a mobile application corresponds to a control value of another mobile application before allowing any interaction between those mobile applications. Interactions between mobile applications may include communicating messages or implementing migrating code for example.

One example control value useful for determining correspondence between applications before they interact is a hash value. One example includes using an SHA hash, which generates 160 bit hashes, which provides more security than hashes using 128 bit algorithms (e.g., MD5). In one example, comparing hashes is preferred over a straightforward binary code comparison because of reliability and bandwidth restrictions in ad-hoc wireless networks. A SHA hash is only 160 bits long, which is relatively easy to communicate within the network, where as a binary file may be arbitrarily and undesirably large for efficient communications.

In one example, a mobile application of the host 22 determines or receives an indication that it must interact with a mobile application of the host 28, for example. The first mobile application of the host 22 determines whether the control value of the second mobile application from the host 28 corresponds, within some selected criteria, to its own control value. In one example, equal hash values are required for appropriate correspondence between the control values. In another example, the control values may differ within some selected range or according to some selected criteria but there will be established limits for determining appropriate correspondence. Whenever there is not appropriate correspondence, communication or interaction between those mobile applications will be denied.

The example illustrated in FIG. 3 includes a helper agent 76. In this example, the helper agent 76 facilitates communicating hash value information between the applications without requiring the one application to send its own hash value to the other, which may allow falsification of hash values in an undesirable manner. The helper agent 76 in one example comprises a program spawned by an application that wishes to determine the hash value for a remotely located application. The helper agent 76 contains a minimal set of information such as the hashing function to reduce bandwidth required for communicating the helper agent 76 across the network. The helper agent 76 in one example is sent by the transceiver 70 to the remote host, performs a hash determination on the remote application and returns to its parent application with the hash information.

If the helper agent 76 does not return with correct information (e.g., a matching or corresponding hash value), the inquiring parent application determines that there is a problem. Example problems include the remote host or the remote application is corrupt, a communication link is down or the parent application itself may be corrupt.

In one example, whenever the control values of the first and second mobile applications do not adequately correspond to each other, the application detecting the problem sends a notification to other mobile applications of its generation (e.g., those with a similar hash function or hash value) with an indication that something is wrong with either that application or the one with which it was supposed to interact. One of the two applications has an incorrect hash value. The notified applications determine which of the two (e.g., the first application on the host 22 or the second application on the host 28) is the problematic one. At least some of the applications in the system will be given the task of monitoring other applications. Such applications can be referred to as "sentinels." One example includes having applications of the same type monitor each other based upon the functions that the application performs. Using this approach will minimize the impact on system resources, for example. Using already existing applications in the system prevents the need for creating extra applications simply for monitoring the applications that are doing the actual work. Additionally, having a sentinel role performed by applications of a similar type minimizes the amount of information needed and updated in each application.

In one example, when the hash values of the two applications do not correspond to each other according to the selected criteria, each application sends out an alert to appropriate sentinels claiming that the other application is corrupted. The sentinels determine which of the two applications is valid by determining the control value (e.g., hash value) for each application. The sentinels share their determinations with each other to obtain a "majority vote" regarding which of the application's control value is valid. When one of the applications is determined to be invalid, it is ignored for purposes of any communications within the network. In one example, the application that is determined to be invalid is automatically terminated upon such a determination. Either or both of these approaches prevents a corrupted or maliciously designed application from spreading this information and disrupting the coordination process among legitimate applications.

The example of FIG. 3 also includes a platform-resident monitor application 80 that dynamically determines whether mobile code should be allowed to execute on a new host. In one example, the resident monitor application 80 is installed on each host prior to deployment. Resident monitor applications in some examples include the ability to kill or abort processes on a host so that it will be able to terminate rogue applications after a consensus vote, for example.

In one example, the resident monitor application 80 software includes an authorization key. Once the corresponding host is added to the network, the resident monitor application 80 will only allow mobile applications with an appropriate key to run on that host.

One example includes assuring the integrity of the resident monitor application 80 by having each generation of mobile application compute a hash of the resident application's software combined with a portion of the mobile application's code. The resulting hash is then reported to other resident applications. In one example, the other resident applications use a distributed voting algorithm similar to that described above to remove any hosts having a compromised or invalid resident application from the network. In one example, any application, resident application or message originating from a host having an invalid resident monitor application 80 will be ignored by the rest of the network until that host has been appropriately cleared to re-enter the network.

Another example technique for determining that control values of mobile applications correspond to each other includes using encrypted messaging. In one example, each generation of mobile applications that is created is provided with a key for encrypting or decrypting messages. Whenever an application receives a message that it cannot understand or decrypt, it discards that message and checks the hash of the application that sent the unintelligible message. In one example, the key changes with every generation so that applications from a previous generation or modified applications that are reintroduced into the system will not be able to communicate with and disrupt the operation of a current generation of applications.

Selecting a plurality of the techniques described above and combining them provides an innovative layering of security techniques that provides a distributed security solution for mobile application networks. Using the disclosed example allows application-based systems to benefit from techniques such as remote hashing, code signature variation, limited application lifetime, resident monitor applications, a mobile application generator, distributed application monitoring, code obfuscation and hashing algorithms that do not increase overhead requirements in a way that renders the protection more burdensome than beneficial. The disclosed example is distributed and capable of continuing to protect even when platforms and applications are removed from the system, corrupted or destroyed. The combination of security techniques described above reinforces the integrity and security of the application system. Even if a sophisticated adversary were to defeat one of the security measures, one of the other techniques most likely will not be defeated by the same attack. The combination of at least two of the techniques described above creates a small window for attack and requires a prohibitively large amount of time and effort to craft a successful attack. This invention, therefore, significantly enhances the security of a mobile application network.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of communicating, comprising:
   protecting an integrity of a wireless network using a combination of at least two of
   (A) obfuscating software code of a mobile application for use in the wireless network;
   (B) providing a mobile application with a plurality of code signatures for generating a corresponding plurality of unique values and periodically, randomly using one of the plurality of code signatures for a selected period of time;
   (C) limiting a useful lifetime of a mobile application to a selected duration; and
   (D) determining that a control value of a first mobile application corresponds to a control value of a second mobile application before allowing an interaction between the first and second mobile applications.

2. The method of claim 1, wherein the step (A) comprises at least one of
   scrambling identifiers of the mobile application;
   changing how data associated with the mobile application is stored in memory; or
   including code within the mobile application that is not used for running the mobile application.

3. The method of claim 1, wherein the step (B) comprises
   arranging code statements within the mobile application to provide a first signature;
   determining a dependency between at least two code statements within the mobile application having the first signature;
   rearranging the at least two code statements within the mobile application to thereby provide a second, different signature while maintaining the determined dependency.

4. The method of claim 1, wherein the step (C) comprises
   using the mobile application for the selected duration;
   rendering the mobile application useless after the selected duration; and
   replacing the mobile application with a second, corresponding mobile application.

5. The method of claim 4, comprising
   using an application generator to generate the second, corresponding mobile application, the application generator having no contact with the second, corresponding mobile application once the second, corresponding mobile application replaces the useless mobile application.

6. The method of claim 4, comprising
   performing steps (A) and (B) on the second, corresponding mobile application before the second, corresponding mobile application replaces the useless mobile application.

7. The method of claim 4, comprising
   providing the second, corresponding mobile application with a different authentication value than an authentication value of the useless mobile application.

8. The method of claim 1, comprising
   performing the step (C) on a plurality of mobile applications such that each of the plurality of mobile applications has a duration that is equal to all of the others of the plurality of mobile applications and the lifetime of all of the plurality of mobile applications expires at about the same time.

9. The method of claim 8, wherein the lifetime of all of the plurality of mobile applications expires simultaneously.

10. The method of claim 1, wherein the step (D) comprises
    determining a hash value of the first mobile application;
    determining a hash value of the second mobile application; and
    determining whether the determined hash values correspond to each other within selected criteria.

11. The method of claim 10, comprising
    determining whether the determined hash values are equal.

12. The method of claim 10, wherein the first application determines the hash value of the second mobile application and the second mobile application determines the hash value of the first mobile application.

13. The method of claim 10, comprising
    determining that the determined hash values do not correspond to each other within the selected criteria;
    communicating the determined hash values of the first and second mobile applications, respectively, to at least one other mobile application;
    using the at least one other mobile application to determine the hash value of each of the first and second mobile applications; and
    using the at least one other mobile application to determine which of the first or the second mobile application has an incorrect hash value.

14. The method of claim 13, comprising
    determining if there is consensus among a plurality of mobile applications regarding the determination of which of the first or second mobile applications has the incorrect value; and
    terminating any communication associated with the first or second mobile application that has the incorrect hash value.

15. The method of claim 1, wherein the step (D) comprises providing a resident monitor application for each host in the wireless network;

providing the resident monitor application with an authorization key; and using each of the resident monitor applications to prevent any application without the authorization key from operating on the corresponding host.

16. The method of claim 15, comprising using at least one mobile application to generate a hash value of the resident monitor application on a corresponding host from at least a portion of code of the resident monitor application and at least a portion of code of the at least one mobile application;

reporting the generated hash value to all other hosts within the wireless network; and using resident monitor applications of each of the other hosts to determine whether the generated hash value is valid to thereby control whether further communications from the host associated with the generated hash value will be accepted within the wireless network.

17. The method of claim 1, wherein the control value of the step (D) comprises an encryption key and comprising using the encryption key to decipher a message received at the first mobile application from the second mobile application;

determining whether the message was successfully deciphered;

if the message was not successfully deciphered, discarding the message and determining a hash of the second mobile application for determining whether the second mobile application is valid.

18. The method of claim 1, wherein the step (D) comprises generating a helper agent application from the first mobile application;

communicating the helper agent application from a first host of the first mobile application to a second host of the second mobile application;

using the communicated helper agent application to determine the control value of the second mobile application at the second host; and communicating the helper agent application back to the first host with the determined control value of the second mobile application.

* * * * *